US006865402B1

(12) United States Patent
Gilbert

(10) Patent No.: US 6,865,402 B1
(45) Date of Patent: Mar. 8, 2005

(54) METHOD AND APPARATUS FOR USING RF-ACTIVATED MEMS SWITCHING ELEMENT

(75) Inventor: Roland Gilbert, Milford, NH (US)

(73) Assignee: Bae Systems Information and Electronic Systems Integration INC, Nashua, NH (US)

( * ) Notice: Subject to any disclaimer, the term of this patent is extended or adjusted under 35 U.S.C. 154(b) by 492 days.

(21) Appl. No.: 09/847,554

(22) Filed: May 2, 2001

Related U.S. Application Data

(60) Provisional application No. 60/201,215, filed on May 2, 2000.

(51) Int. Cl.[7] .......... H04M 1/00

(52) U.S. Cl. .......... 455/562.1; 455/83; 455/77; 455/575.5

(58) Field of Search .......... 455/73, 77, 82–84, 455/87, 554.2, 562.1, 575.5, 90.3; 250/336.1; 343/700; 333/262

(56) References Cited

U.S. PATENT DOCUMENTS

| | | | | | |
|---|---|---|---|---|---|
| 3,849,745 | A | | 11/1974 | Schellenberg et al. | |
| 3,940,770 | A | | 2/1976 | Fassett et al. | |
| 4,010,474 | A | | 3/1977 | Provencher | |
| 4,864,314 | A | | 9/1989 | Bond | |
| 5,144,319 | A | | 9/1992 | Roberts | |
| 5,289,496 | A | * | 2/1994 | Nakagawa et al. | 375/135 |
| 5,457,465 | A | | 10/1995 | Collier et al. | |
| 5,485,167 | A | | 1/1996 | Wong et al. | |
| 5,541,614 | A | | 7/1996 | Lam et al. | |
| 5,561,434 | A | | 10/1996 | Yamazaki | |
| 5,578,976 | A | | 11/1996 | Yao | |
| 5,790,080 | A | | 8/1998 | Apostolos | |
| 5,943,011 | A | | 8/1999 | Acoraci et al. | |
| 5,949,303 | A | | 9/1999 | Arvidsson et al. | |
| 6,008,762 | A | | 12/1999 | Nghiem | |
| 6,069,540 | A | * | 5/2000 | Berenz et al. | 333/101 |
| 6,069,587 | A | | 5/2000 | Lynch et al. | |
| 6,078,288 | A | | 6/2000 | Adams et al. | |
| 6,100,694 | A | | 8/2000 | Wong | |
| 6,127,908 | A | | 10/2000 | Bozler et al. | |
| 6,154,176 | A | | 11/2000 | Fathy et al. | |
| 6,198,438 | B1 | * | 3/2001 | Herd et al. | 343/700 MS |
| 6,242,989 | B1 | * | 6/2001 | Barber et al. | 331/177 V |
| 6,307,452 | B1 | * | 10/2001 | Sun | 333/262 |
| 6,384,353 | B1 | * | 5/2002 | Huang et al. | 200/181 |
| 6,384,797 | B1 | * | 5/2002 | Schaffner et al. | 343/795 |
| 6,452,465 | B1 | * | 9/2002 | Brown et al. | 333/205 |
| 6,509,875 | B1 | * | 1/2003 | Nair et al. | 343/700 MS |
| 6,538,621 | B1 | * | 3/2003 | Sievenpiper et al. | 343/909 |
| 6,587,021 | B1 | * | 7/2003 | Streeter | 333/262 |
| 6,618,189 | B2 | * | 9/2003 | Tangonan | 359/298 |
| 2001/0040530 | A1 | * | 11/2001 | Livingston et al. | 343/768 |
| 2001/0040675 | A1 | * | 11/2001 | True et al. | 355/77 |
| 2002/0072163 | A1 | * | 6/2002 | Wong et al. | 438/200 |
| 2002/0151281 | A1 | * | 10/2002 | Izadpanah et al. | 455/83 |
| 2003/0122079 | A1 | * | 7/2003 | Pobanz et al. | 250/336.1 |

* cited by examiner

*Primary Examiner*—Lester G. Kincaid
(74) *Attorney, Agent, or Firm*—Maine & Asmus

(57) ABSTRACT

The present invention features an RF-actuated microelectromechanical systems (MEMS) switch for use with switchable RF structures such as antennas. An antenna within each MEMS switch module is coupled to a tuned circuit and a detector. The DC voltage output of the detector is used as the control input to the MEMS switch. This allows arrays of MEMS switch modules to be actuated by remotely generated radio frequency signals thus alleviating the need for running metallic conductors or optical fibers to each MEMS switch. The MEMS switch is particularly suited for use in conjunction with both passive and active antenna elements to allow reconfiguration of antenna or other RF structures. Frequency response characteristics, phasing, and directionality characteristics may be altered easily.

17 Claims, 7 Drawing Sheets

METHOD AND APPARATUS FOR USING RF-ACTIVATED MEMS SWITCHING ELEMENT

RELATED APPLICATIONS

This application claims priority to U.S. Provisional Patent Application Ser. No. 60/201,215, filed May 2, 2000.

FIELD OF THE INVENTION

This invention pertains to the field of switches and, more particularly, to RF-actuated micro-electro-mechanical systems (MEMS) switches for use in conjunction with microwave antennas and similar applications.

BACKGROUND OF THE INVENTION

The need for reconfigurable antennas and other radio frequency (RF) structures is great. In an era of crowded frequency bands, diverse requirements for multi-frequency communication, etc., antenna structures able to perform in one or more bands or with switchable directionability characteristics are of great interest. One solution to the problem is the use of reconfigurable antennas or other structures (e.g., reflective structures). Generally speaking, these are antennas or associated resonant structures which may have their frequency and/or their directional characteristics altered so as to perform in one or more frequency bands and/or with one or more directionability patterns.

Switched antenna elements have been used for some time, portions of the structures being connected and disconnected by a switch. PIN diodes and GaAs Field Effect Transistors (FETs) have been used to perform these switching operations. The devices typically require a bias current, making their use cumbersome. The advent of microelectromechanical systems (MEMS) has allowed the creation of ultra-small switches. The introduction of MEMS switches has created new possibilities in the RF communications field. For example, multiple ground planes behind a single radiating element may be switched in or out of the circuit using an array of MEMS switches. The MEMS switches can be constructed as bi-stable devices and are switched by the application of an electrical voltage to an input terminal. Of course, any DC voltage source may be used to activate the MEMS switches.

In high frequency (i.e., microwave, millimeter wave, etc.) applications, the introduction of copper or other conductive materials into or near an RF structure may have an undesirable effect. Added wires and conductors may scatter the RF fields around antennas thereby distorting the antenna radiation patterns or affecting their impedance. If the switch control wires can be concealed by the antenna elements or their RF feeds, then the interference with the operation of the antenna can be minimized. However, only a few antenna elements allow embedding of the control lines.

To address this problem, strategies have been developed to use a photovoltaic cell to generate a DC switching voltage for the MEMS switch. A laser light source and optic fiber then are used to activate the MEMS switch. Laser light shining on several photovoltaic cells in series creates a voltage that causes the MEMS switch to change state; a passive antenna element or other structure connected thereto is switched in or out of the circuit.

In some applications, the running of fiber optic strands from a laser light source to the array of MEMS switches is not practical. Also, if the switches must be enclosed in an opaque material, then neither visible nor infrared (IR) light can be used to activate them effectively.

DESCRIPTION OF THE RELATED ART

U.S. Pat. No. 5,541,614 for SMART ANTENNA SYSTEM USING MICROELECTROMECHANICALLY TUNABLE DIPOLE ANTENNAS AND PHOTONIC BAND GAP MATERIAL, issued Jul. 30, 1996 to Juan F. Lam, et al., teaches a reconfigurable antenna system. LAM, et al. disclose an antenna system including a set of symmetrically located, center-fed, segmented, dipole antennas. A two-dimensional array of microelectromechanical transmission line switches is incorporated into the dipole antennas to connect the segments thereof. The segments can be connected or disconnected by operating the switches in the closed or open position. Appropriate manipulation or programming of the MEMS switches changes the polarization of the radiation pattern, scanning properties, and resonant frequency of the antenna array.

The LAM et al. system utilizes electrical conductors (e.g., copper) to conduct switching voltages to the MEMS switch array. The inventive apparatus, on the other hand, utilizes an RF beam to actuate self-contained, RF-actuated MEMS devices. This allows the inventive array to be located in areas where feeding control voltages to-the MEMS If switches via a copper or similar conductor would be impractical. The invention also overcomes problems associated with photonically-switched MEMS switch devices. The frequency of the RF signal that activates the MEMS switches is different than the frequency of the RF signals that pass through the MEMS switches.

SUMMARY OF THE INVENTION

The present invention features (RF) radio frequency actuated MEMS switches for use in switchable RF structures such as antennas. The actuating energy for the switches is supplied by switched millimeter or sub-millimeter wavelength RF signals. The actuating RF signals reach an antenna, are passed to a tuned circuit, and are ultimately applied to a detector where a DC voltage, proportional to the intensity of the control RF signal, is generated for changing the state of the MEMS switches. Arrays of antenna elements with MEMS switches having receivers tuned to different frequencies allows multiple switched arrays of antenna or similar RF elements.

It is, therefore, an object of the invention to provide an RF-activated MEMS switch.

It is a further object of the invention to provide an RF activated MEMS switch wherein the illuminating RF energy is in millimeter or sub-millimeter wavelength regions.

It is another object of the invention to provide an RF activated MEMS switch which may be tuned to a number of different illuminating frequencies.

It is an additional object of the invention to provide an RF-actuated MEMS switch which may be packaged with a suitable miniature antenna, tuned circuit, detector, and optional storage capacitor in a sealed package.

It is yet another object of the invention to provide an RF-actuated MEMS switch which may be deployed in arrays, responsive to RF actuating signals of different frequencies.

It is a still further object of the invention to provide an RF-actuated MEMS suitable for use with switched antenna elements, switched FSS elements, switched scatterers (conductors) within artificial dielectrics and switched conductive screens.

It is another object of the invention to provide RF actuated MEMS switches with sufficient isolation to nonactivating frequencies to permit the construction of antenna structures, consisting of antenna elements or segments, FSS elements, artificial dielectrics, frequency selective volumes (FSVs) and conductive screens that contain groups of MEMS switches that may be activated separately by different activation frequencies.

It is yet another object of the invention to provide an RF-actuated MEMS suitable for laminating within a multilayer printed circuit structure.

An object of the invention is an RF-actuated microelectromechanical systems (MEMS) switch module, comprising an antenna for receiving an externally-generated RF control signal, and providing an antenna output signal representative thereof. A receiver means operatively connected to the antenna for receiving the antenna output signal and generating a DC voltage representative thereof. And, a MEMS switch element having a control voltage port connected to the receiver means and at least two switching ports connectable to one another upon application of the DC voltage to the control voltage port, whereby the switching ports of the MEMS switches are connected to one another when the externally-generated RF control signal is received at the antenna.

Another object of the invention is the RF-actuated MEMS switch module, wherein the receiver means comprises a tuned circuit operatively connected to the antenna and having an input port for receiving the antenna output signal. The tuned circuit and the antenna form a circuit substantially resonant at the RF control signal, wherein the tuned circuit provides a tuned circuit output signal. There is a detector means operatively connected to the tuned circuit to receive the tuned circuit output signal and to generate a DC voltage representative thereof.

A further object is the RF-actuated MEMS switch module, wherein the antenna is tuned to a frequency related to the externally-generated RF control signal.

Another object is the RF-actuated MEMS switch module, wherein the MEMS switch element is bi-stable, whereby the switchable ports are alternately connectable to and disconnected from one another upon application of the externally-generated RF control signal of sufficient strength to generate a voltage signal to operate the MEMS switches. The DC signal can be increased by a number of methods well known in the art to achieve the sufficient switching voltage.

Yet another object is the RF-actuated MEMS switch module, further comprising a capacitor operatively connected between the control voltage port and a fixed reference voltage, wherein said fixed reference voltage may be ground potential.

Additionally, an object includes the RF-actuated MEMS switch module, further comprising encapsulating material substantially completely surrounding the antenna, the tuned circuit, the detector, the capacitor and the MEMS switch element, with the switching ports being presented outside said encapsulating material. And, wherein the encapsulating material is opaque.

Yet another object is the RF-actuated MEMS switch module, wherein the MEMS module is connected to an active or passive microwave antenna element.

A further object is the RF-actuated MEMS switch module, wherein the MEMS module forms part of a multilayer printed circuit structure.

Also an object is the RF-actuated MEMS switch module, wherein the externally-generated RF control signal comprises an RF signal having a wavelength of approximately one millimeter.

An object of the invention is an RF-actuated microelectromechanical systems (MEMS) switch module, comprising a MEMS switch element having at least two switched ports alternately connectable one to the other upon application of a control voltage at a control voltage port of the MEMS switch. There is an antenna for receiving an externally-generated RF control signal having a predetermined frequency, and providing an antenna output signal representative thereof, the antenna being tuned to the predetermined frequency. There is a tuned circuit operatively connected to the antenna and having an input port for receiving the antenna output signal and, in cooperation with the antenna, providing a circuit substantially resonant at a frequency related to the predetermined frequency of the RF control signal, the tuned circuit providing a tuned circuit output signal. Finally, there is a detector means operatively connected to the tuned circuit for receiving the tuned circuit output signal and generating a DC voltage representative thereof, the detector means also being operatively connected to the control voltage port of the MEMS switch. The two switching ports of the MEMS switch are alternately connected to and disconnected from one another when the externally-generated RF control signal is received at the antenna and a sufficient DC voltage can manipulate the MEMS switch.

Additionally, an object is the RF-actuated MEMS switch module, further comprising a capacitor operatively connected between the control voltage port and a fixed reference voltage, wherein the fixed reference voltage may be ground potential.

Yet a further object is the RF-actuated MEMS switch module, further comprising encapsulating material substantially completely surrounding the antenna, the tuned circuit, the detector, the capacitor and the MEMS switch element, the switching ports being presented outside the encapsulating material.

Additionally, an object is the RF-actuated MEMS switch module, wherein the MEMS switch module is included within a multi-layer printed circuit structure.

An object of the invention is a selectively changeable RF element, comprising at least two RF sub-elements electrically connectable to one another by an RF-actuated MEMS switch, the RF-actuated MEMS switch receiving an RF control signal at a predetermined frequency and, in response thereto, selectively connecting the sub-elements.

Another object is the selectively changeable RF element, wherein the RF element forms part of at least one antenna structure from the group antenna element, antenna segment, frequency-selective surface (FSS), artificial dielectric, and frequency-selective volume (FSV).

A final object is the selectively changeable RF element wherein the RF-actuated MEMS switch comprises at least two RF-actuated MEMS devices adapted to respond to RF actuating signals at least two different frequencies.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Generally speaking, this invention relates to microelectromechanical systems (MEMS) switches and, more particularly, to RF-actuated MEMS switches suitable for use in frequency-agile, steerable, self-adaptable, programmable and conformal antenna systems.

Figure 1:
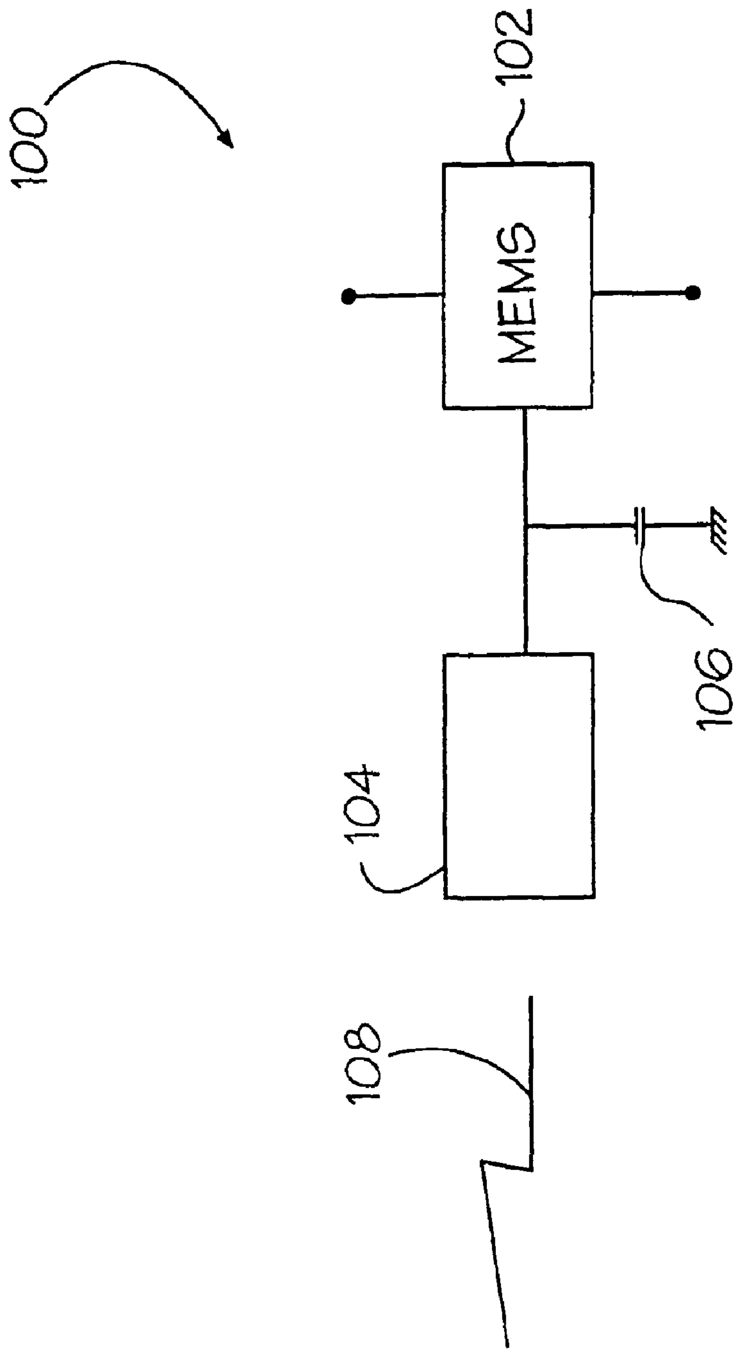
Prior Art Figure 1
FIG. 1 is a schematic block diagram of a light-actuated MEMS switch of the prior art.

Referring first to prior art FIG. 1, there is shown a typical MEMS switch element suitable for use with a switched radio frequency antenna element, generally at reference number 100. MEMS switch 102 is attached to a photovoltaic cell 104. A laser beam 108 illuminates photovoltaic cell 104, causing the MEMS switch 102 to change states. An optional capacitor 106 may be utilized at the switch input. Laser light 108 is generally conducted to photovoltaic cell 104 by an optical fiber (not shown). Because, in many operating situations, the deliverance of a laser light beam 108 to a photovoltaic cell 104 or MEMS switch 102 is not practical, any other switched DC voltage source, as are well known to those skilled in the art, could be utilized to provide a control voltage to MEMS switch 102.

Figure 2:
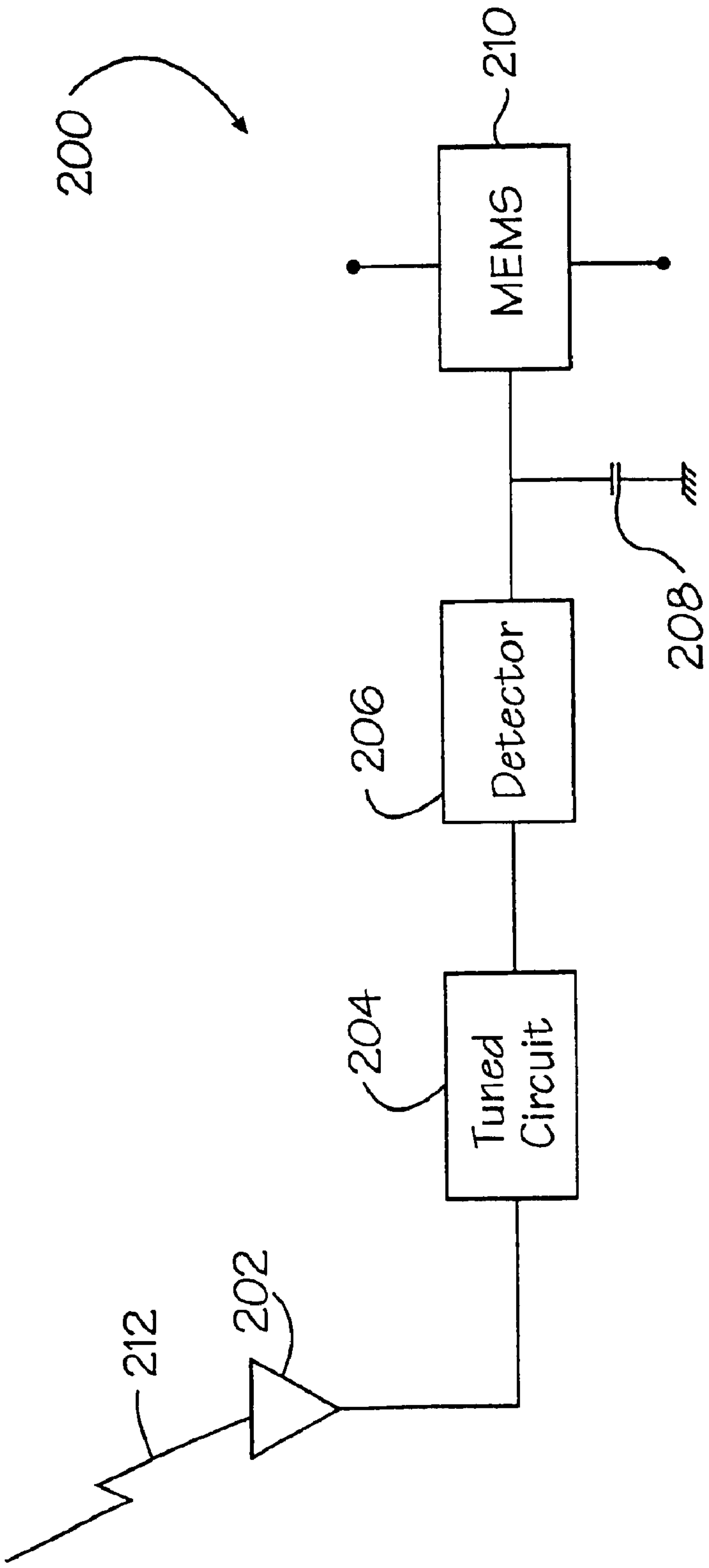
FIG. 2 is a schematic block diagram of the inventive, RF-actuated system of the present invention.

Referring now to FIG. 2, there is shown an RF-actuated switching apparatus generally at reference numeral 200. In this embodiment, the switching control input of the MEMS switch 210 is switching voltage from the output of a detector 206 and optional, grounded capacitor 208. The timed circuit 204 and detector 206 are well known in the art and used to achieve the desired voltage signal to operate the MEMS switch, and is tuned to a specific millimeter/sub-millimeter wavelength. An antenna 202, is connected to tuned circuit 204, which could be as simple as a diode and capacitor arrangement to detect a CW signal and integrate that signal over a short time interval. The output of tuned circuit 204 feeds the detector 206.

MEMS need a certain voltage, typically 10–15V to switch. The power of the CW or modulated signal is used to charge the capacitor that is used to activate the MEMS switch. The origination power depends upon the distance to the antenna and the configuration of the circuitry and whether voltage doublers or other means to augment the voltage signals are employed.

The use of radio frequency (RF) energy eliminates the need for an optic fiber and the deliverance of laser light or the like. This means that the MEMS switch assembly 200 may be located anywhere that a radio frequency signal 212 may be received having an adequate signal strength at antenna 202 to switch the MEMS switch 210. The MEMS switch 210 requires very little power to switch, and standard MEMS switches or preferably bi-stable switches can be used.

Figure 3:
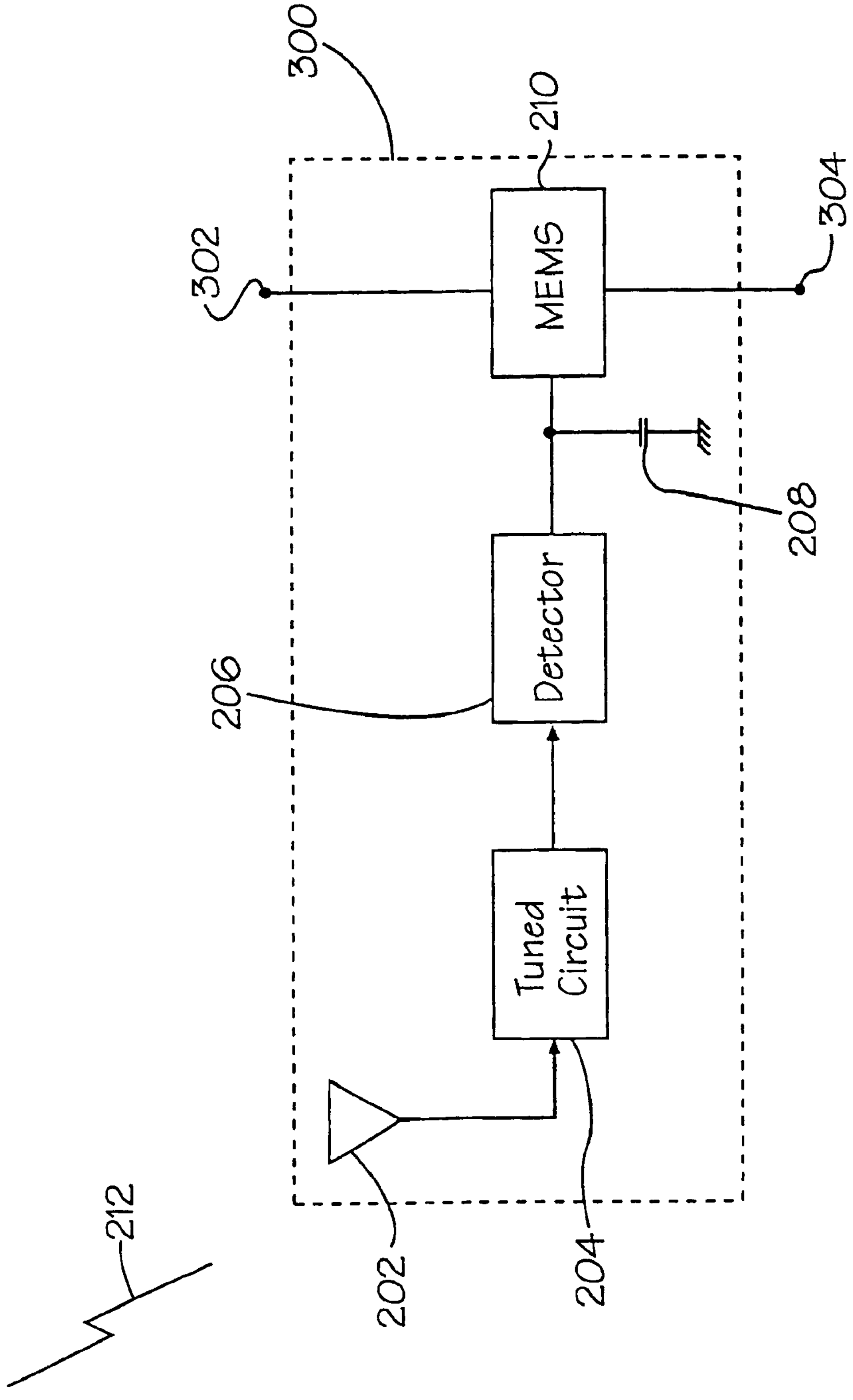
FIG. 3 is a schematic block diagram of the inventive, RF-actuated system shown as an encapsulated module.

Referring now also to FIG. 3, the radio frequency actuated MEMS circuit 200 (FIG. 2) is shown as an encapsulated assembly 300. This is possible because there is no longer any requirement for an optical input to MEMS switch assembly 300. A pair of switched terminals 302, 304 is available outside of MEMS switch assembly 300.

Figure 4:
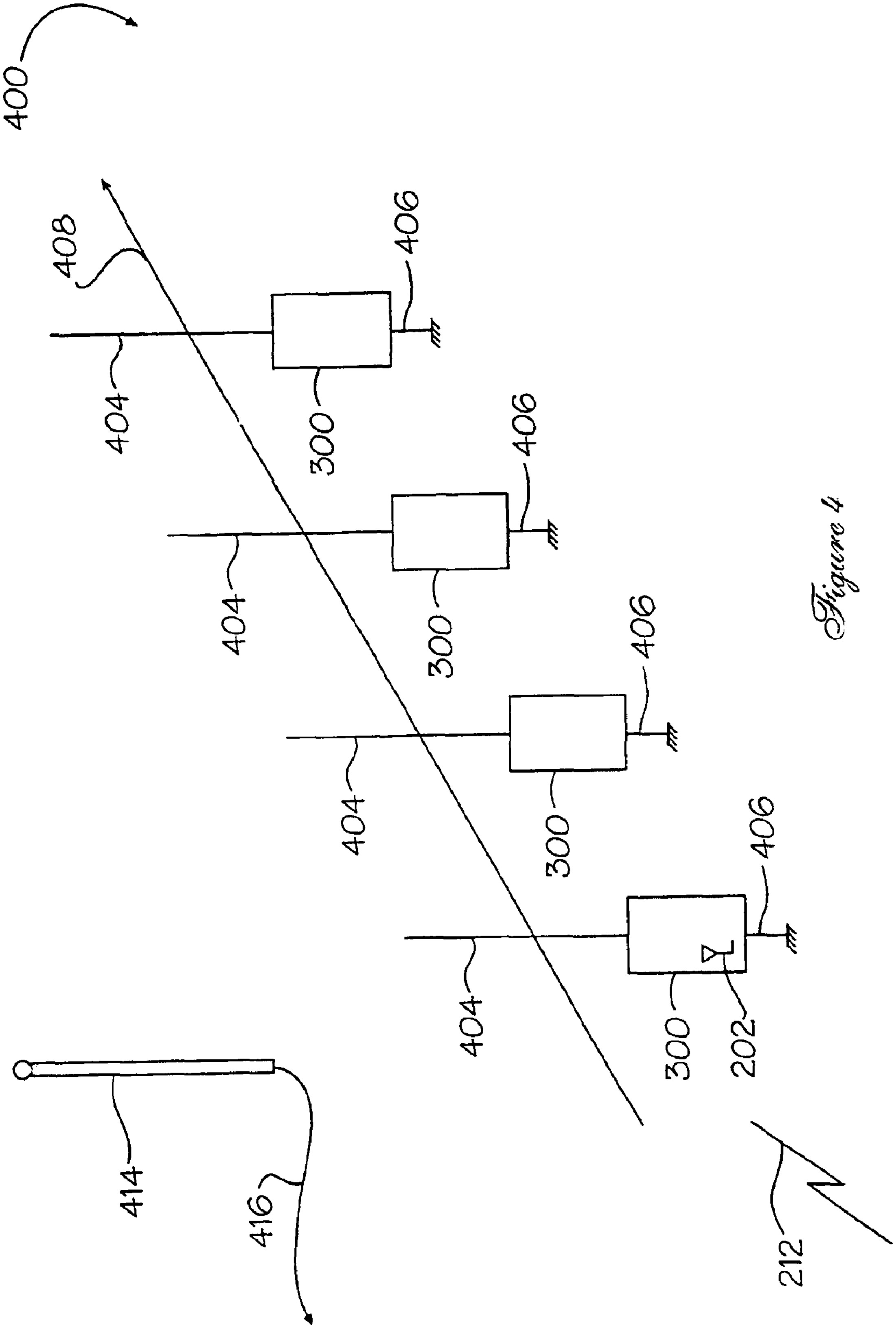
FIG. 4 is a schematic perspective view showing a typical application of a MEMS switch, wherein a dipole radiator with a MEMS switch-selectable ground plane is disposed in a plane.

Referring now to FIG. 4, there is shown an array of antenna elements generally at reference numeral 400, with RF actuated MEMS switch assemblies, as shown in FIG. 3. This illustrates a typical application of the inventive MEMS switch module 300. A dipole radiating element 414 is fed by a transmission line 416.

Four reflective elements 404 aligned in a plane 408 are each connected to an RF actuated MEMS switch assembly 300 and then to ground 406. When MEMS switch assembly 300 conducts, antenna elements 404 are effectively grounded and form a ground plane coincident with plane 408. MEMS switch assemblies 300 are actuated by RF control signal 212 received at antenna 202 within each MEMS switch assembly 300.

Figure 5:
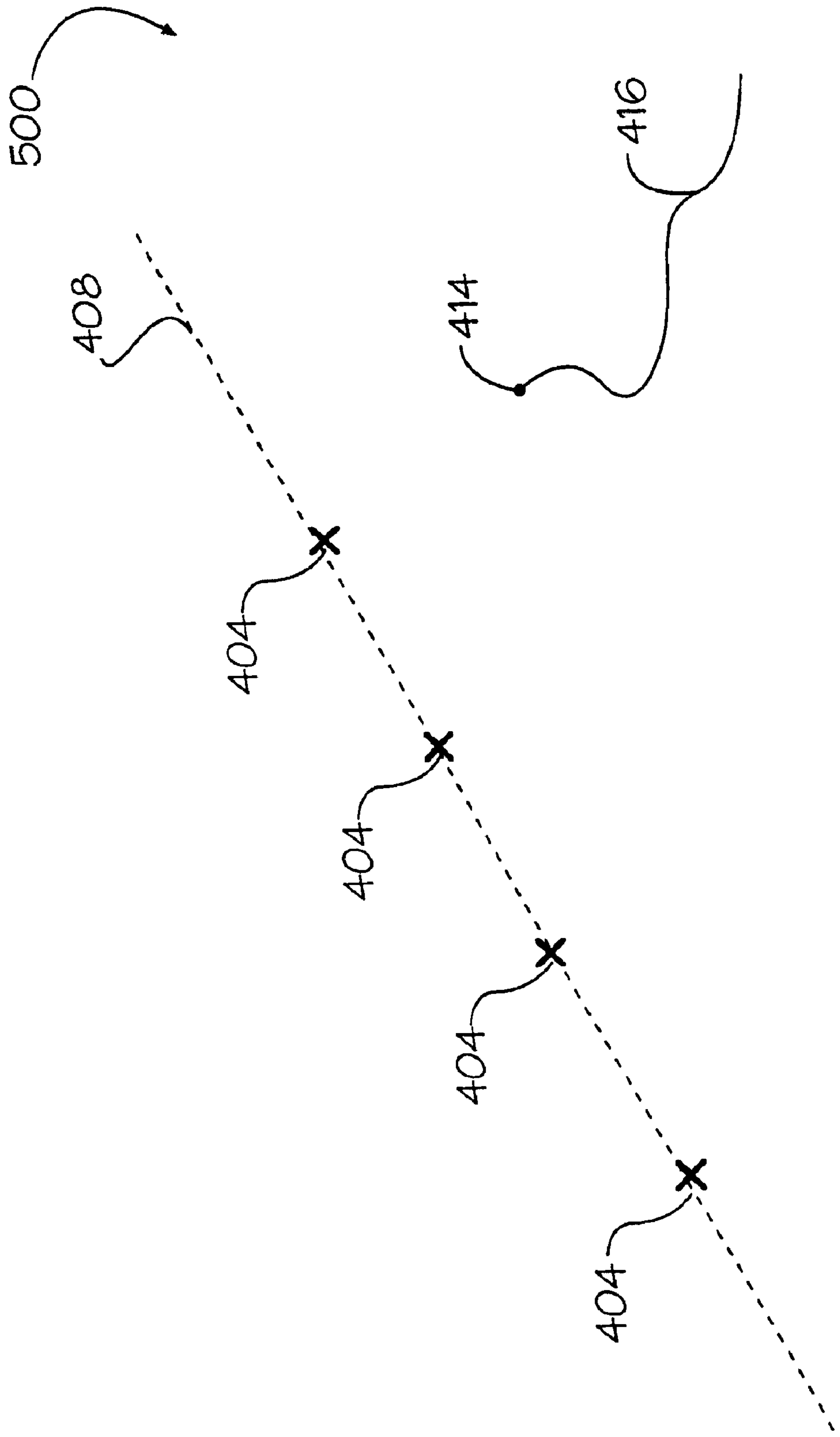
FIG. 5 is a schematic top view of the array shown in FIG. 4.

Referring now also to FIG. 5, there is shown, generally at reference 500, a top view of the array of elements 404 depicted in FIG. 4.

Figure 6:
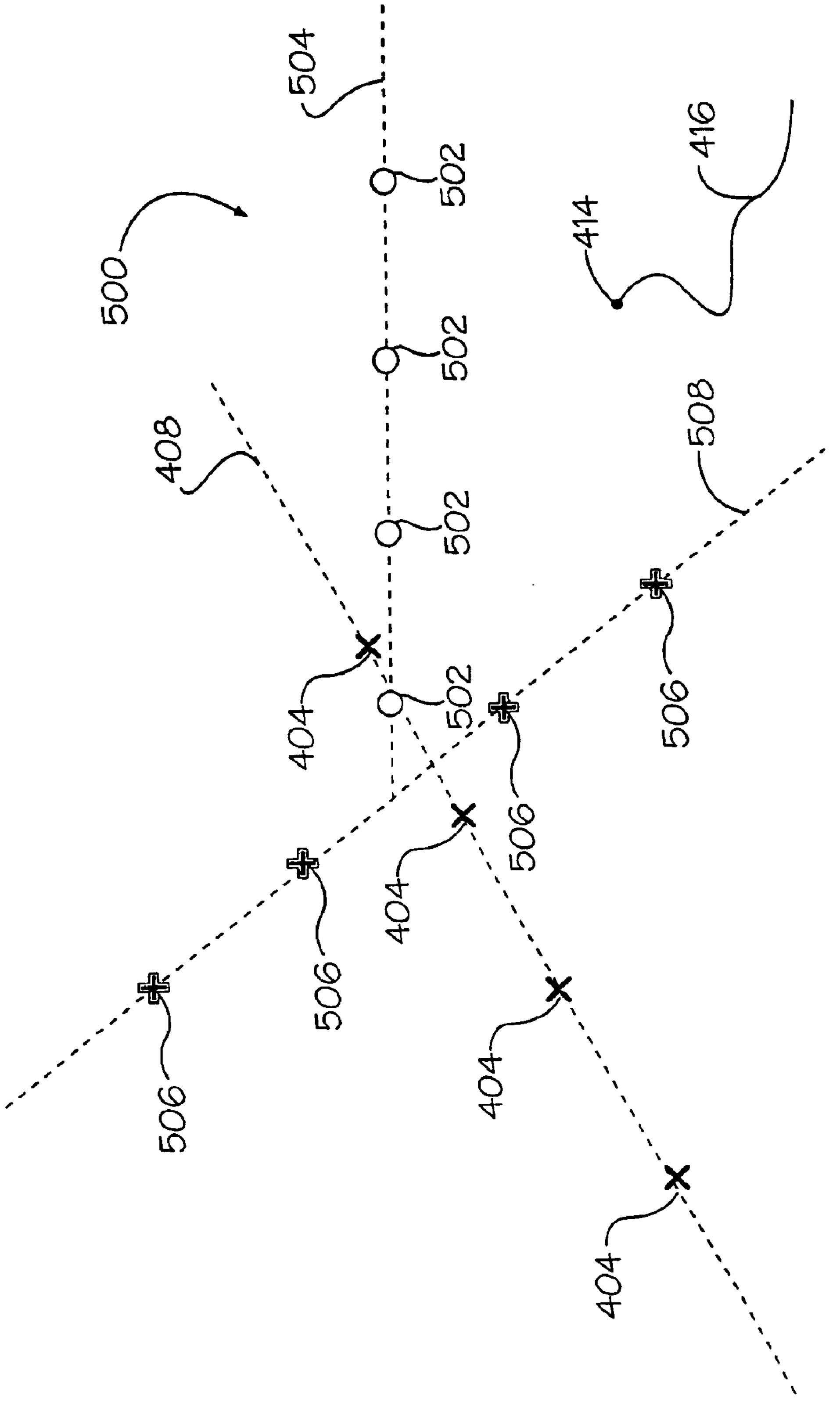
FIG. 6 is a top view showing multiple switch-selectable arrays.

Referring now also to FIG. 6, elements 404 in plane 408 are shown. In addition, two additional sets of reflective elements 502, 506 are deployed in planes 504 and 508, respectively. Assuming that MEMS devices 300 (FIG. 4) associated with elements 404, 502 and 506 are tuned to different operating frequencies, the arrays in planes 408, 504 and 508 may be independently switched, thereby altering the directional characteristics of dipole radiator 414.

Figure 7:
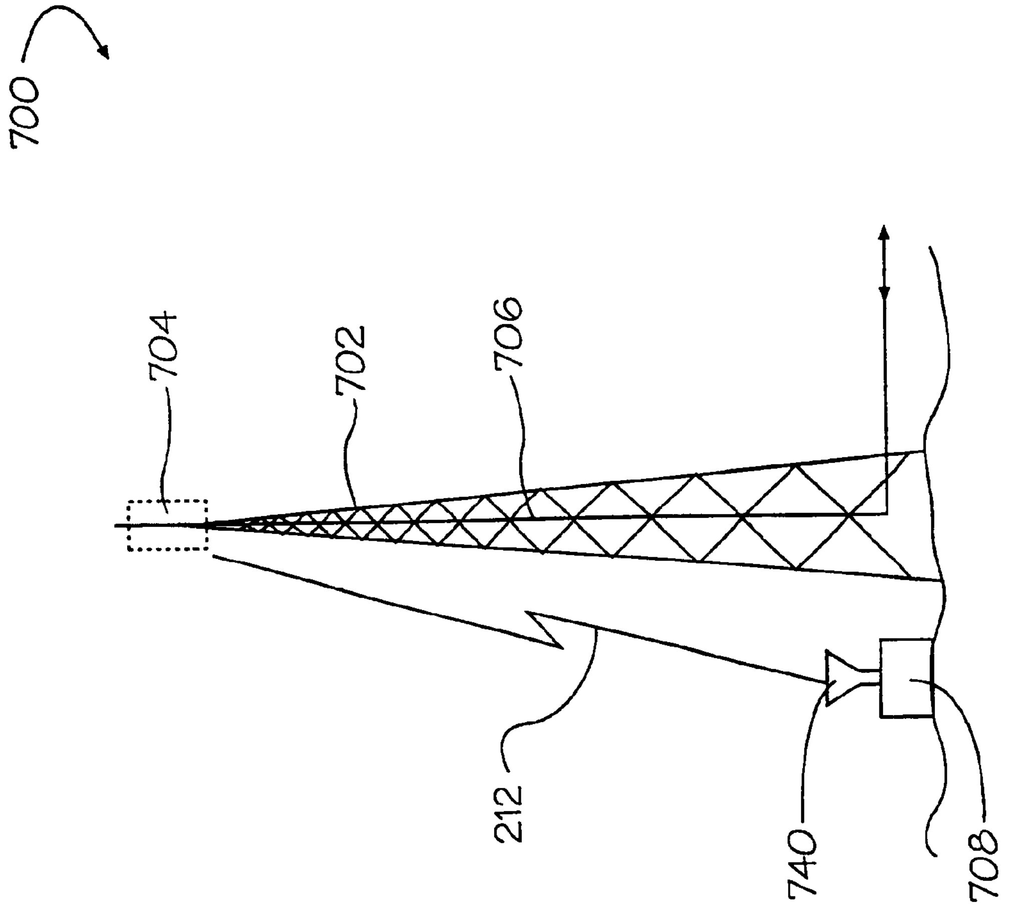
FIG. 7 is a schematic view of a tower installation in a typical application of the inventive RF-actuated MEMS switch.

Referring now to FIG. 7, there is shown a schematic view of a typical tower installation, generally reference numeral 700, utilizing the inventive MEMS devices 300. A tower structure 702, such as is well known to those skilled in the art, has an antenna array 704 disposed on the top thereof to provide omni-directional or sectorized coverage. One or more feedlines 706 are used to connect antenna array 704 to a receiver/transmitter (not shown). Antenna array 704 can include one or more RF-actuated MEMS switches 300 of the instant invention. These MEMS switches 300 are actuated by an RF signal 212 generated at an RF signal source 708 and upwardly fed through a horn antenna 740. It will be obvious to those skilled in the art that a wide variety of RF sources and/or antenna structures could be utilized to provide an RF signal 212 to MEMS 300 in antenna array 704.

While this is a simplistic example, it should be clear that many other antenna topologies may be constructed using the inventive MEMS switch modules to switch either active or passive elements.

There are instances in cellular communications, especially near a busy highway, where there is a need to have more channel capacity in one direction, while simultaneously providing omni-directional coverage around the cell tower. This may be done by sectorizing coverage and, if there is enough isolation between the sectors, the same frequency channels may be reused. By illuminating the appropriate MEMS switches to form the required corner reflectors or ground planes, the sector coverage may be adjusted to fit the current need. The characteristics of a cell tower could be altered by changing the characteristics of material reflector behind a central feed. During part of the day the antenna can direct beams in a certain direction and be switched to a different direction by changing the bulk material forming the reflector via an RF pulse signal changing the arrangement of the antenna elements.

One application of the present invention is to alter the dielectric, reflective, or polarization properties of bulk materials. Using fibers to control multiple switches would be impractical and difficult to administer, thereby necessitating a wireless means for controlling the switches. The MEMS switches would be bi-stable switches and flip when pulsed by the detector circuit. For example, in a microwave application for a frequency range of 2–30 GHz, an external 90 GHz pulse could be used to throw the switches within the bulk material all at one time, thereby altering the characteristics of the material. The switches thereby are activated without interfering with the signal of interest. Another embodiment is to selectively switch the MEMS switches by configuring the tuned detector circuit to operate at a different frequency signal. Different frequencies would then operate certain select switches and provide customization of different operating characteristics.

Another application relates to inventory control and reconfigurable tagging units. The tag units typically are magnetic strips and the deactivation unit bums the diode in the coil to deactivate the device. Using the present invention, tags could be tuned to a particular frequency and set to mark different items or deactivate groups of tags.

Since other modifications and changes varied to fit particular operating requirements and environments will be apparent to those skilled in the art, the invention is not considered limited to the example chosen for purposes of disclosure, and covers all changes and modifications which do not constitute departure from the true spirit and scope of this invention.

Having thus described the invention, what is desired to be protected by Letters Patent is presented in the subsequent appended claims.

What is claimed is:

1. An RF-actuated microelectromechanical systems (MEMS) switch module, comprising:

an antenna for receiving an externally-generated RF control signal, and providing an antenna output signal representative thereof;

a receiver operatively connected to said antenna for receiving said antenna output signal and generating a DC voltage representative thereof; and a MEMS switch element having a control voltage port connected to said receiver and at least two switching ports operable upon application of said DC voltage to said control voltage port:

whereby said at least two switching ports of said MEMS switch element are actuated when said externally-generated RF control signal is received at said antenna.

2. The RF-actuated MEMS switch module as recited in claim 1, wherein said receiver comprises:

a tuned circuit operatively connected to said antenna and having an input port for receiving said antenna output signal, wherein said tuned circuit and said antenna form a circuit substantially resonant at said RF control signal, said tuned circuit providing a tuned circuit output signal: and a detector operatively connected to said tuned circuit to receive said tuned circuit output signal and to generate said DC voltage representative thereof.

3. The RF-actuated MEMS switch module as recited in claim 2, wherein said tuned circuit is tuned to a frequency related to said externally-generated RF control signal.

4. The RF-actuated MEMS switch module as recited in claim 1, wherein said MEMS switch element is bi-stable, whereby said at least two switching ports are alternately connected to and disconnected from one another upon application of said externally-generated RF control signal.

5. The RF-actuated MEMS switch module, as recited in claim 1, further comprising:

a capacitor operatively connected between said control voltage port and a fixed reference voltage.

6. The RF-actuated MEMS switch module, as recited in claim 5, wherein said fixed reference voltage is ground potential.

7. The RF-actuated MEMS switch module, as recited in claim 2, further comprising:

encapsulating material substantially completely surrounding said antenna, said tuned circuit, said detector, and said MEMS switch element, said at least two switching ports being presented outside said encapsulating material.

8. The RF-actuated MEMS switch module, as recited in claim 7, wherein said encapsulating material is opaque.

9. The RF-actuated MEMS switch module, as recited in claim 4, wherein said MEMS module is connected to an active microwave antenna element.

10. The RF-actuated MEMS switch module, as recited in claim 4, wherein said MEMS module is connected to a passive microwave antenna element.

11. The RF-actuated MEMS switch module, as recited in claim 7, wherein said MEMS module forms part of a multi-layer printed circuit structure.

12. The RF-actuated MEMS switch module, as recited in claim 1, wherein said externally-generated RF control signal comprises an RF signal having a wavelength of approximately one millimeter.

13. An RF-actuated microelectromechanical systems (MEMS) switch module, comprising:

a MEMS switch element having at least two switching ports alternately connectable one to the other upon application of a control voltage at a control voltage port of said MEMS switch.

an antenna for receiving an externally-generated RF control signal having a predetermined frequency, and providing an antenna output signal representative thereof, said antenna being tuned to said predetermined frequency;

a tuned circuit operatively connected to said antenna and having an input port for receiving said antenna output signal and, in cooperation with said antenna providing a circuit substantially resonant at a frequency related to said predetermined frequency of said RF control signal, said tuned circuit providing a tuned circuit output signal; and a detector operatively connected to said tuned circuit for receiving said tuned circuit output signal and generating a DC voltage representative thereof, said detector also being operatively connected to said control voltage port of said MEMS switch.

whereby said two switching ports of said MEMS switch element are alternately connected to and disconnected from one another when said externally-generated RF control signal is received at said antenna.

14. The RF-actuated MEMS switch module, as recited in claim 13, further comprising:

a capacitor operatively connected between said control voltage port and a fixed reference voltage.

15. The RF-actuated MEMS switch module, as recited in claim 14, wherein said fixed reference voltage is ground potential.

16. The RF-actuated MEMS switch module as recited in claim 13, further comprising: encapsulating material substantially completely surrounding said antenna, said tuned circuit, said detector, and said MEMS switch element, said at least two switching ports being presented outside said encapsulating material.

17. The RF-actuated MEMS switch module, as recited in claim 16, wherein said MEMS switch module is included within a multi-layer printed circuit structure.

* * * * *